United States Patent [19]
Podoll

[11] Patent Number: 4,792,263
[45] Date of Patent: Dec. 20, 1988

[54] CARRIER FOR LARGE CAPACITY SINGLE OVERHEAD PNEUMATIC TUBE SYSTEM

[75] Inventor: Michael J. Podoll, Marion, Iowa

[73] Assignee: Inter Innovation LeFebure Manufacturing Corporation, Cedar Rapids, Iowa

[21] Appl. No.: 98,939

[22] Filed: Sep. 21, 1987

Related U.S. Application Data

[62] Division of Ser. No. 875,923, Jun. 19, 1986, Pat. No. 4,715,750.

[51] Int. Cl.4 .............................................. B65G 51/06
[52] U.S. Cl. .................................... 406/189; 406/111; 220/345
[58] Field of Search ............................ 406/184–190, 406/110, 111, 112; 220/345, 346

[56] References Cited

U.S. PATENT DOCUMENTS

| | | | |
|---|---|---|---|
| 358,450 | 3/1887 | Hurlbut | 220/346 |
| 681,041 | 8/1901 | Cowley | 406/188 |
| 3,080,136 | 3/1963 | Kelley et al. | 406/111 |
| 3,201,064 | 8/1965 | Dagle et al. | 220/345 X |
| 3,690,593 | 9/1972 | Kettering | 406/186 |
| 3,940,091 | 2/1976 | Ekama et al. | 406/186 |
| 4,009,796 | 3/1977 | Schmidt | 220/345 X |
| 4,436,456 | 3/1984 | Thomas | 406/112 X |
| 4,512,688 | 4/1985 | Hochradel | 406/111 |

FOREIGN PATENT DOCUMENTS

539069 11/1931 Fed. Rep. of Germany ...... 406/186

*Primary Examiner*—Sherman D. Basinger
*Assistant Examiner*—Paul E. Salmon
*Attorney, Agent, or Firm*—Simmons, Perrine, Albright & Ellwood

[57] ABSTRACT

A single overhead pneumatic tube system employs a large rectangular tube, a pair of overhead mounted blowers and a large rectangular captive carrier having a pair of oppositely disposed sliding covers which are locked in position when the carrier is passing from one terminal to the other. The locking means for each cover includes a pair of diagonally offset bolts having heads exposed through apertures in the cover. The locking bolts of the two covers are interconnected so that withdrawal of the bolts of one cover by pressure on their bolt heads also withdraws the bolts of the other cover and so unlocks both covers at the same time.

10 Claims, 8 Drawing Sheets

CARRIER FOR LARGE CAPACITY SINGLE OVERHEAD PNEUMATIC TUBE SYSTEM

CROSS-REFERENCE TO RELATED APPLICATION

This application is a division of application Ser. No. 875,923, filed June 19, 1986.

BACKGROUND OF THE INVENTION

The present invention is for use in a large capacity version of the pneumatic banking system described and claimed in the co-pending application of William D. Thomas, Ser. No. 710,934, filed Mar. 11, 1985, or in other such systems or the like using a rectangular tube.

In that system, briefly, a single overhead tube interconnects a pair of teller and customer terminals. A pair of blowers, each a small proprietary vacuum cleaner unit, are mounted atop the horizontal stretch of the tube adjacent the tube bends which descend to the terminals below. Each blower operates only to exhaust air from the tube, being fitted with a check valve so that when not operating no air can be drawn through it into the tube. A carrier is sent from one terminal to the other by energizing the blower above the other or opposite terminal. The carrier is thereby drawn up from the one terminal whose receiver at that time is open to the atmosphere below the carrier. As soon as the carrier passes the blower above the opposite terminal it falls of its own weight into the receiver of that terminal which is closed at that time to the atmosphere so that the carrier is braked by the column of air between it and the closed receiver. The chief features of this system are the use of small twin blowers, rather than a single large one, and the placement of both blowers overhead, usually above the "ceiling" hiding the horizontal run of the tube. This results in much less blower noise at the customer terminal, in which the typical single larger blower in other systems is located, with consequent reductions in both the size of the customer terminal itself and the driveway or other site needed for it.

The foregoing system is eminently suitable for individual account bank customers because it transmits the carriers between the terminals at a relatively high rate of speed, about 20 feet per second. But that system lacks sufficient capacity for commercial or business customers who must deposit large quantities of coins, stacks of bills, checks and the like inasmuct as the carriers used are relatively small and cylindrical in shape. The systems currently in use for commercial or business customers tend to be wholly mechanical, or a combination of mechanical and pneumatic, in nature and their carriers travel much more slowly, about 4 feet per second, too slow for individual account customers. Furthermore, in the system of the Thomas application the carriers are also removable from the terminals by the customer and the teller. When that system is adapted to transport much larger and heavier loads, the carriers involved must also be larger and heavier to the extent that it is no longer feasible for them to be removable from the terminals. This is simply because they are too bulky and weighty for customers to manipulate easily. Thus the carriers must be non-removable, which is to say that "captive" carriers, as they are called, are needed. And that in turn requires that the carriers have a fixed orientation in the pneunmatic tube so that its closure, whether hinged, sliding or whatever, is always presented to the customer or the teller, as the case may be, after it arrives in its respective terminal receiver. This is possible with a cylindrical carrier if access to it is through each of its ends. But a cylindrical carrier is not as suitable or as efficient for transport of large, more or less rectangular items. Nor is its interior as readily acessible through its ends. If instead access is through the cylindrical wall of the carrier, special means must be employed to assure the carrier is always presented with its closure to the customer or teller. So for efficient capacity and ease of positive orientation the carrier must be other than cylindrical, such as rectangular in shape, whereby the pneumatic tube itself must also be of the same shape.

Accordingly, the chief object of the invention is to adapt the pneumatic system of the Thomas application to the transport of larger, heavier items using a captive carrier which is automatically opened and presented to a customer and the teller when it arrives at their resepctive terminals.

SUMMARY OF THE INVENTION

The foregoing objects are achieved by providing the receiver at the customer terminal with a platform or shelf upon which the carrier arrives, which shelf is secured in turn to a front wall of the receiver hinged for outward movement in order to tilt the top end of the carrier toward the customer. The carrier itself is rectangular in shape and its leading and trailing ends, that is to say, its top and bottom, are each covers slidable to one side for access to the interior. When the carrier is tilted in the manner indicated its top cover lies beneath and engages a motor driven sliding panel at the front of the customer terminal. The panel drive motor is then automatically energized to slide the panel, and thus the top cover of the carrier, to one side to open the carrier to the customer. When the latter completes his or her transaction the panel drive motor is activated to close the panel and the top cover of the carrier, after which the carrier is automatically returned to within the receiver and dispatched to the teller terminal. When the carrier arrives at the latter terminal its other end is then the "top" and a somewhat similar mechanism, in the form of a drawer forming a part of the teller receiver, automatically moves the carrier forwardly out from the teller terminal and at the same time retains the top cover of the carrier within the receiver so that the carrier is presented to the teller in open condition.

Since the carrier covers from the leading and trailing ends of the carrier, their edges also serve to guide the carrier through the pneumatic tube and hence are fitted with appropriate material for that purpose. The fact that the covers also guide the carrier requires that the covers be locked in their closed position during carrier travel for otherwise the covers would tend to move relative to the carrier, especially when traversing bends in the tube, and so slow or jam the carrier. Hence the carrier incorporates a locking mechanism for each cover which is automatically released when the carrier arrives at the customer or teller terminal and then automatically relocked when the carrier leaves the terminal. This is achieved by a simple, direct mechanical engagement of the locking mechanism by upstanding probes at both terminals, rather than by a solenoid activated plunger or the like typically found in other captive carrier systems.

The empty weight of the carrier used in the present invention is about 20 pounds and can easily transmit a 20 pound load at speeds of 10 to 12 feet per second or about three times the speed of present systems for commercial or business customers. Hence the system of the invention can also be used for individual account customers since its speed is not too much less than that of other current pneumatic systems is use for such customers. Other features and advantages of the invention will appear from the drawings and the more detailed description which follows.

DETAILED DESCRIPTION OF THE PREFERRED EMBODIMENT a. The System

Figure 1:
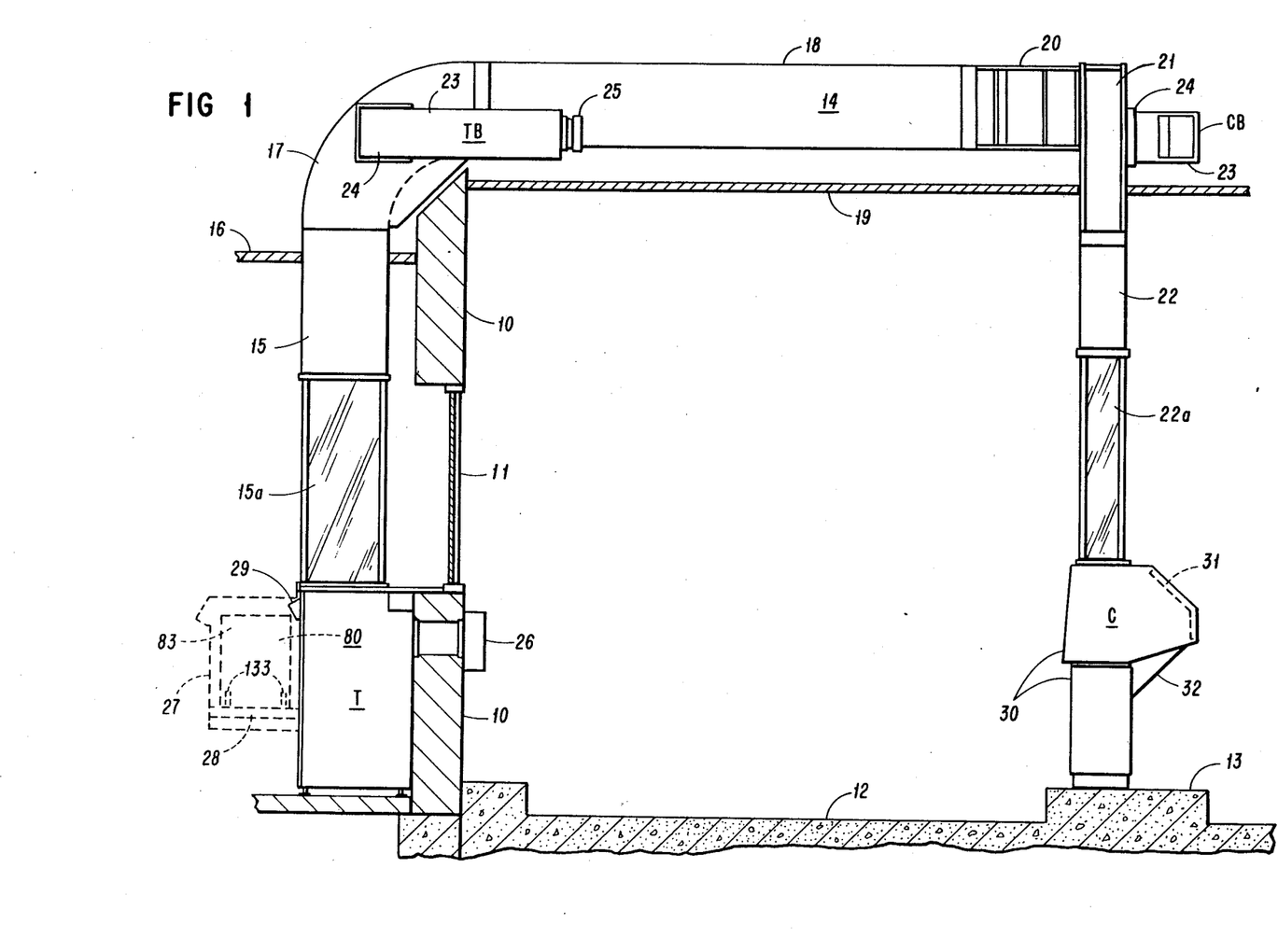
FIG. 1 is an elevational view of a single overhead tube pneumatic system according to the invention.

Turning first to FIG. 1, the teller terminal T is shown sited within a teller building 10 having a window 11 looking out across a driveway 12 to the customer terminal C perched on an island 13. From the terminal T rises the rectangular pneumatic tube, generally indicated at 14, having a vertical section 15 up through a false ceiling 16 into a vertical bend section 17, thence a horizontal section 18 above a false ceiling 19 over the driveway 12, a horizontal bend section 20, a second vertical bend section 21 back through the ceiling 19, and finally a second vertical section 22 down into terminal C. The lower portions of the vertical sections 15 and 22 have transparent walls 15a and 22a so as to appear less obtrusive.

Figure 2:
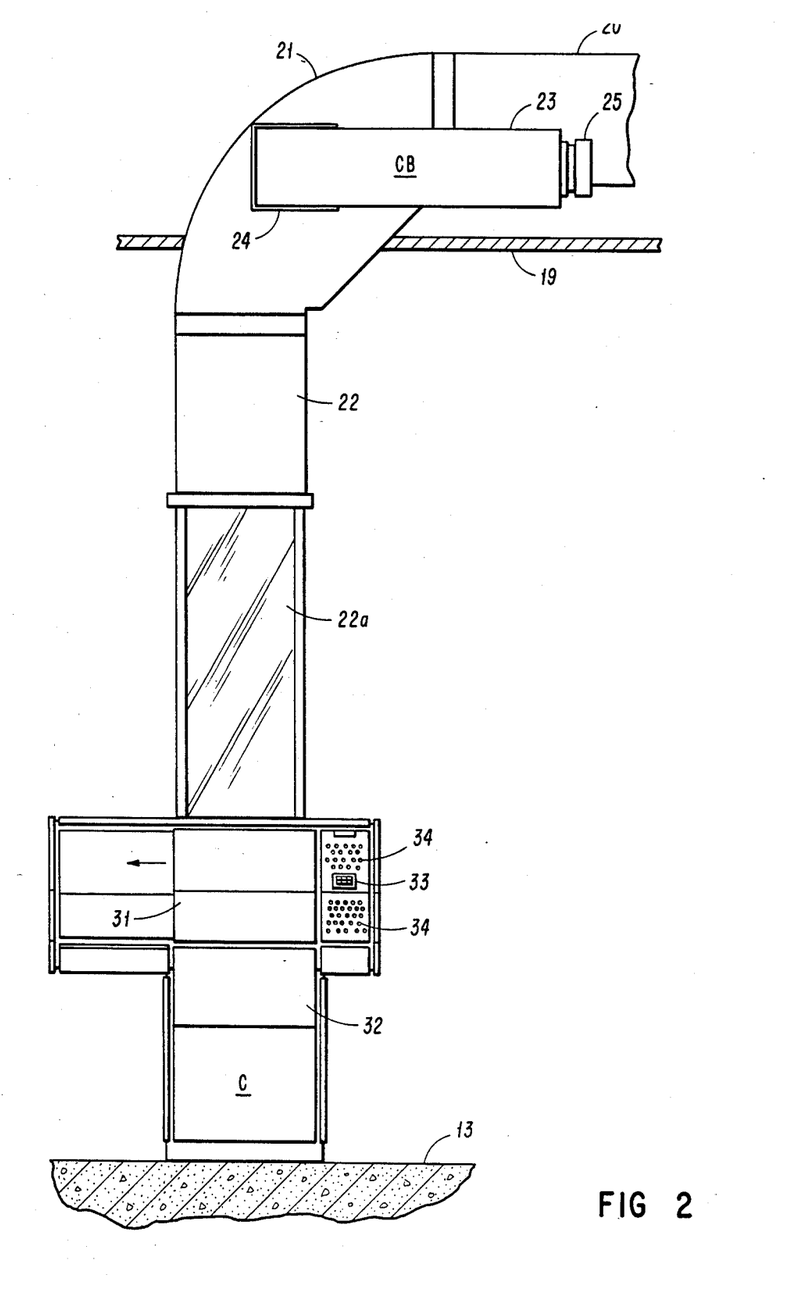
FIG. 2 is a front elevational view of the customer terminal employed in the system.

The blowers TB and CB are mounted to the bend sections 17 and 21 above the ceilings 16 and 19 (see FIG. 2). Each blower TB and CB consists of five ordinary vacuum cleaner units connected in parallel (to provide sufficient air volume) within a housing 23, each blower exhausting air from the tube 14 through openings 24 in the bend sections 17 and 21 and ports 25. Check valves (not shown) disposed at the openings 24 prevent any passage of air through the blowers TB and CB into the tube 14. Exterior air is supplied to the terminal T and beneath a carrier therein through an intake 26 when the blower CB is operating to pull the carrier from the terminal T to the terminal C, which intake 26 is closed when a carrier is sent in the opposite direction in order to provide an air cushion brake in the tube section 15 and the teller receiver 27. The receiver 27 is in the form of a sliding drawer in the terminal T, including a portion of its front wall, having a cushioned carrier supporting platform or shelf 28, the open position of the receiver 27 being indicated by broken lines in FIG. 1. Appropriate controls 29 for the system are disposed upon the receiver 27 and include a "Power" switch and carrier "Send" and "Recall" buttons.

b. The Customer Receiver

The terminal C comprises a composite housing 30 having an inclined upper face, a laterally sliding door panel 31, and an inclined lower fixed panel 32, the housing 30 carrying on its exterior appropriate controls such as customer "Send" and "Teller Call" buttons 33 and microphone and speaker grilles 34 (see FIGS. 1 and 2). Within the housing 30 is disposed an upright customer terminal receiver, generally indicated at 35 (See FIGS. 3 and 4), or overall rectangular shape. The receiver 35 includes a sheet metal rear wall 36, whose lower inner face carries air inlet ports 37, and a pair of flanged side walls 38 reenforced by hat sections 39 welded thereto. The top of the receiver 35, of course, is open for entry and exit of carriers. The front of the receiver 35 is partially closed by a panel 40, also reenforced by hat sections 41 welded thereto and by rearward lateral flanges 42 embracing the side walls 38. A pair of angle members 43 are also welded to the panel 40 along its lateral edges, the lower ends of which are screwed to a shelf plate 44 which extends rearwardly to adjacent the rear wall 36. Within the receiver 35 the plate 44 is rectangularly apertured at 45 for purposes to be described. A transverse block 46 is screwed in turn along and below the outer edge of the plate 44, the lateral ends of the block 46 carrying trunnions 47 journaled in bracket plates 48 secured to the inner faces of the side walls 38, whence the panel 40 can tilt outwardly and downwardly from the receiver 35. A pair of pivot blocks 49 are secured adjacent the upper corners of the panel 40 for purposes to be described. Above the panel 40 a shallower panel 50, similarly reenforced by hat section 51 and side flanges 52, is transversely pivoted at its upper end on trunnions 53 to the side walls 38, whence it can swing outwardly and upwardly from the receiver 35. A pair of similar pivot blocks 54 are secured adjacent the lower corners of the panel 50 for purposes to be described. The panel 50 is provided with a lower lip 55 overlapping the top edge of the panel 40 and with an upper lip 56 overlapping the lower edge of a fixed panel 57 closing the front of the receiver 35 thereabove.

Figure 3:
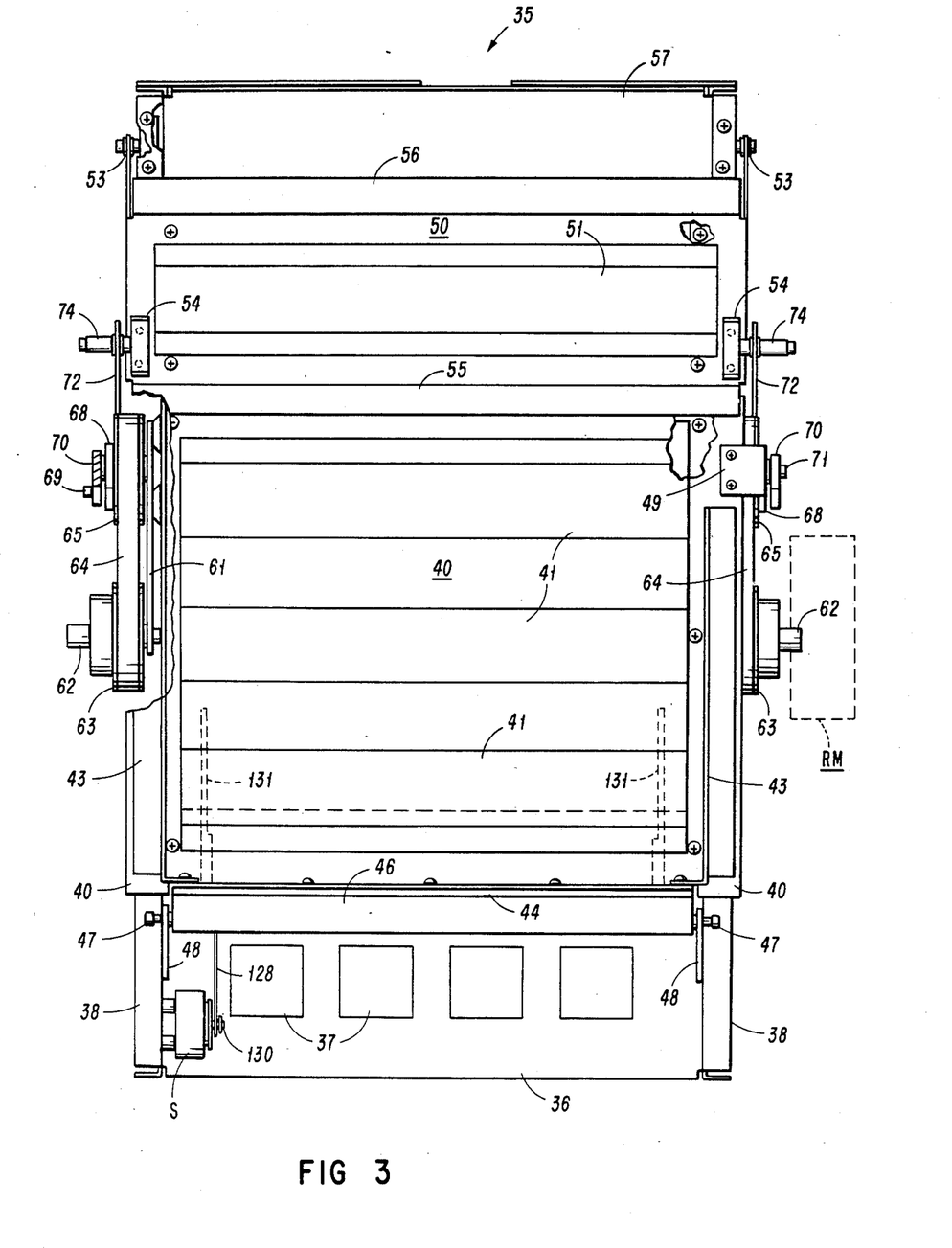
FIG. 3 is a front elevational view of the receiver, shown in its closed position, employed in the customer terminal of FIG. 2.
Figure 4:
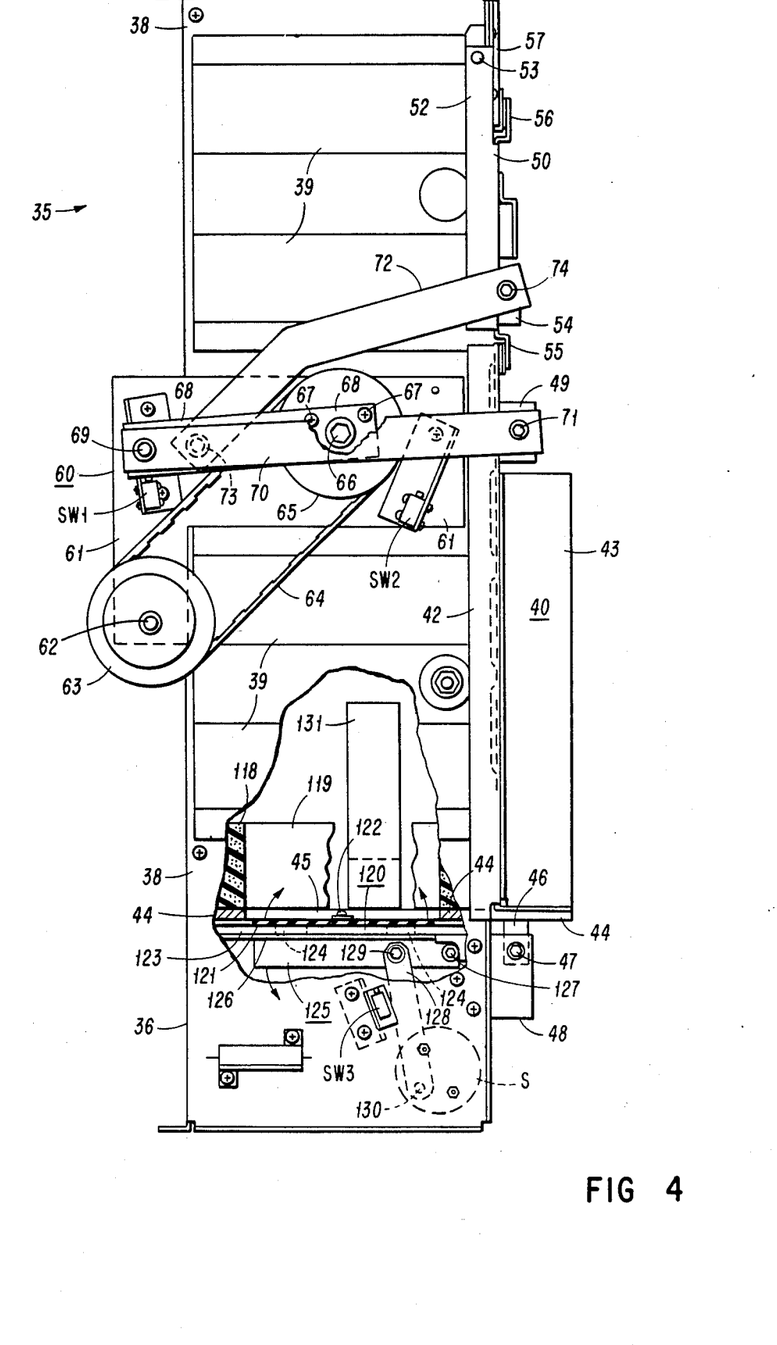
FIG. 4 is a side elevational view of the receiver of FIG. 3.
Figure 5:
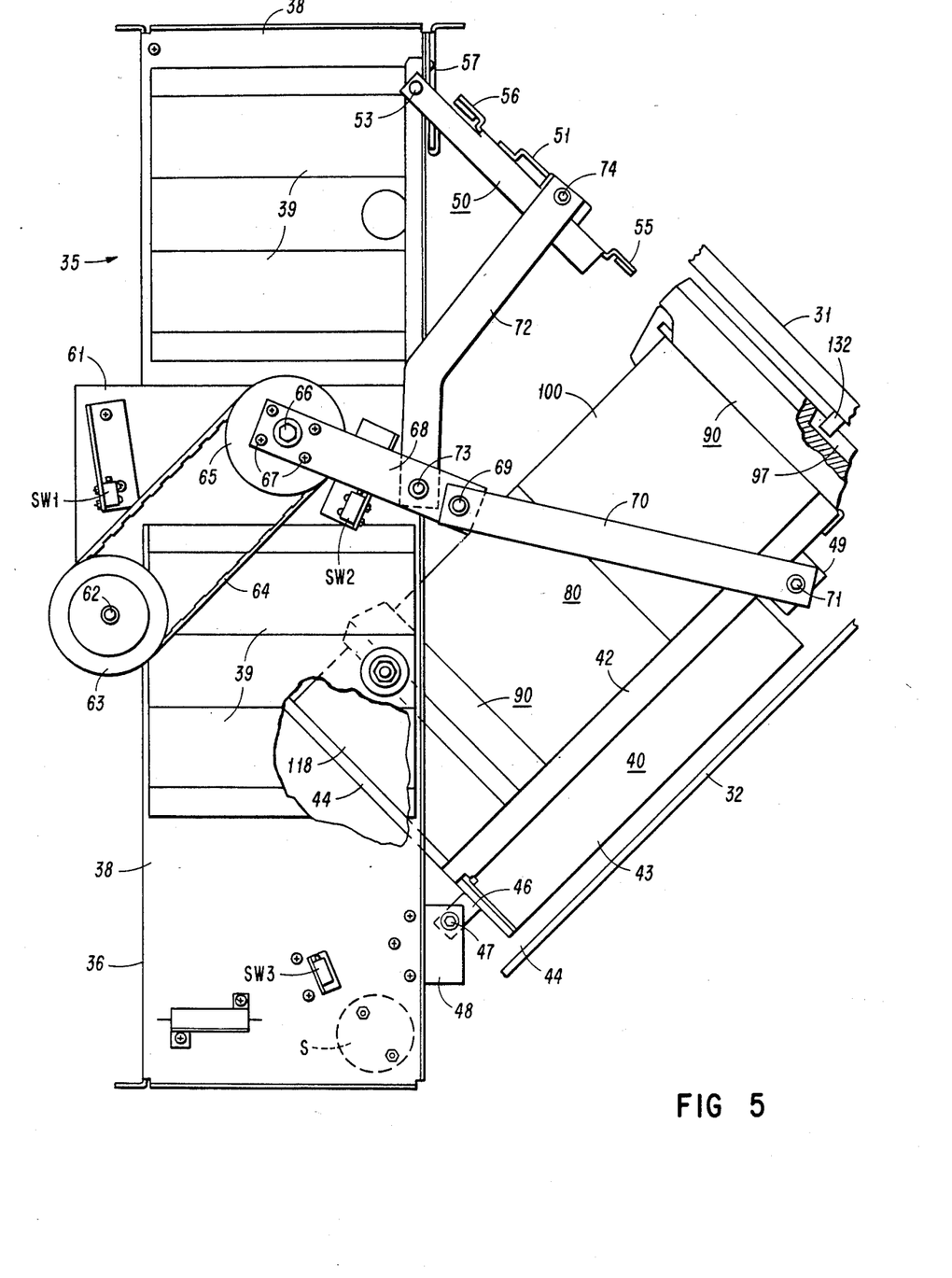
FIG. 5 is a side elevational view of the receiver of FIG. 4 but shown in its open position, the location of a carrier being shown thereon.

The panel 40 and 50 are opened and closed by a motor driven linkage, generally indicated at 60 in FIG. 4, and supported by a pair of horizontal, L-shaped bracket plates 61 fixed to the receiver side walls 38 and extending somewhat rearwardly therefrom. A drive shaft 62 is journaled between the lower ends of the paltes 61 across the rear of the receiver 35 to whose outer ends are fixed a pair of drive pulleys 63. An appropriate electric motor and reduction gear train RM suitably drive the shaft 62 as indicated in FIG. 3. From the pulleys 63 drive belts 64 engage a pair of driven pulleys 65 journaled at 66 on the bracket plates 61 midway between the front and rear of the receiver 35. To the outer faces of the pulleys 65 are secured at 67 the forward ends of a pair of rearwardly extending drive arms 68 whose other ends are pivoted at 69 to the ends of a pair of outboard link arms 70. The link arms 70 extend forwardly from the pivots 69 and are journaled in turn at 71 at their other ends to the pivot blocks 49 on the panel 40. The ends of a pair of cranked link arms 72 are pivoted at 73 to the drive arms 68 inboard thereof and just forwardly of the pivots 69, the link arms 71 extending forwardly and upwardly and journaled at 74 at their other ends to the pivot blocks 54 of the panel 50. Accordingly, when the motor RM is energized, the pulleys 63, belts 64, and pulleys 65 rotate the drive arms 68 clockwise in FIG. 4 and thereby the link arms 70 and 72, whereby the panel 40 will tilt outwardly and downwardly about its trunnions 47 and the panel 50 outwardly and upwardly about its trunnions 53 to the positions shown in FIG. 5 and thus open the receiver 35. Appropriate limit switches SW1 and SW2 are engaged by one of the drive arms 68, as indicated in FIGS. 4 and 5, to control operation of the motor RM.

c. The Carrier

Figure 6:
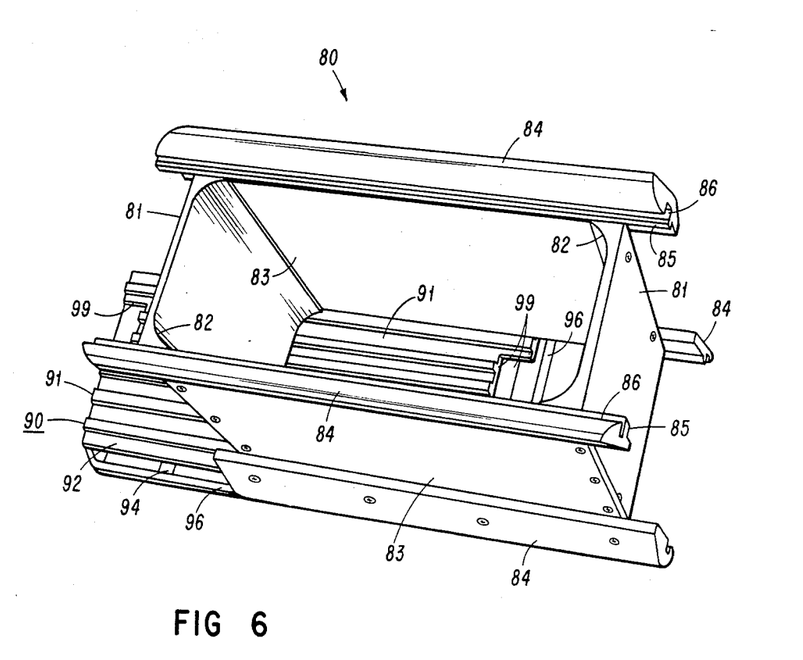
FIG. 6 is a perspective veiw of a partially assembled carrier illustrating its interior and one of the sliding covers in partially open position.
Figure 7:
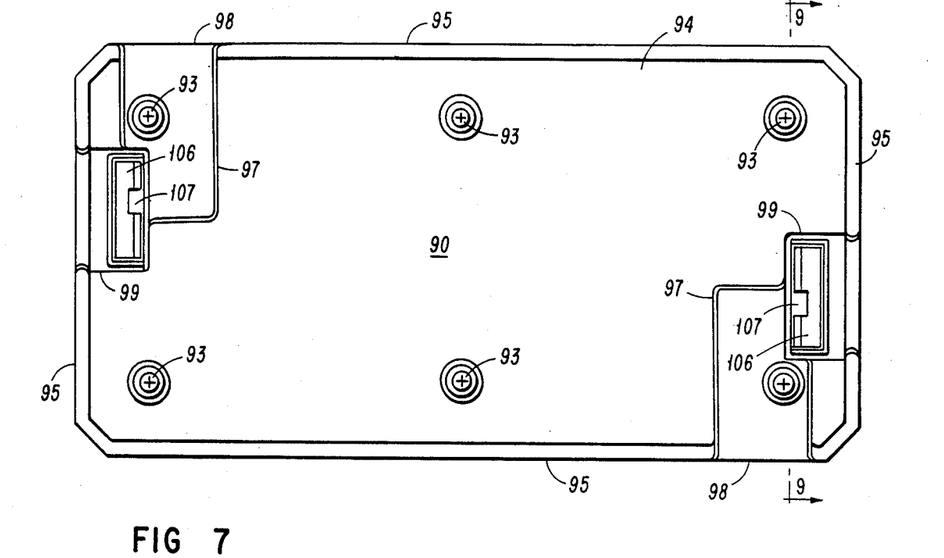
FIG. 7 is an end elevational view of the carrier itself illustrating one of the sliding covers in closed position.

The rectangular carrier, generally indicated at 80, comprises extruded alloy side walls 81 with cuneate inner corners 82 disposed between a pair of alloy plate side walls 83 screwed to the former (see FIG. 6). To the longer edges of the side walls 83 are screed molded lengths of nylon forming carrier glides 84 having inner longitudinal lips 85 overlying the edges of the side walls 83 and inner longitudinal grooves 86 (see FIGS. 6 and 9), the ends of the glides 84 extending beyond the end walls 81 for purposes to be described. The two carrier covers, generally indicated at 90 (see FIGS. 6-9), close the open ends of the carrier 80. Each includes a ribbed alloy end plate 91 whose lateral edges 92 are received and slide in the glide grooves 86 and to whose outer faces are screwed at 93 end caps 94 molded from nylon. The four sides of the caps 94 have beveled edges 95 which include lips 96 whose outer faces closely abut the interior of the pneumatic tube 14. Diagonally opposite corners of the ends caps 94 are recessed at 97, which recesses open at 98 through the adjacent longitudinal edges of the end caps 94, all for purposes to be described. Adjacent the recesses 97 the plates 91 and end caps 94 are rectangularly apertured therethrough to provide diagonally offset openings 99, also for purposes to be described. Hence, as indicated in FIG. 8, the covers 90 can slide either way to open and close the carrier 80.

Figure 8:
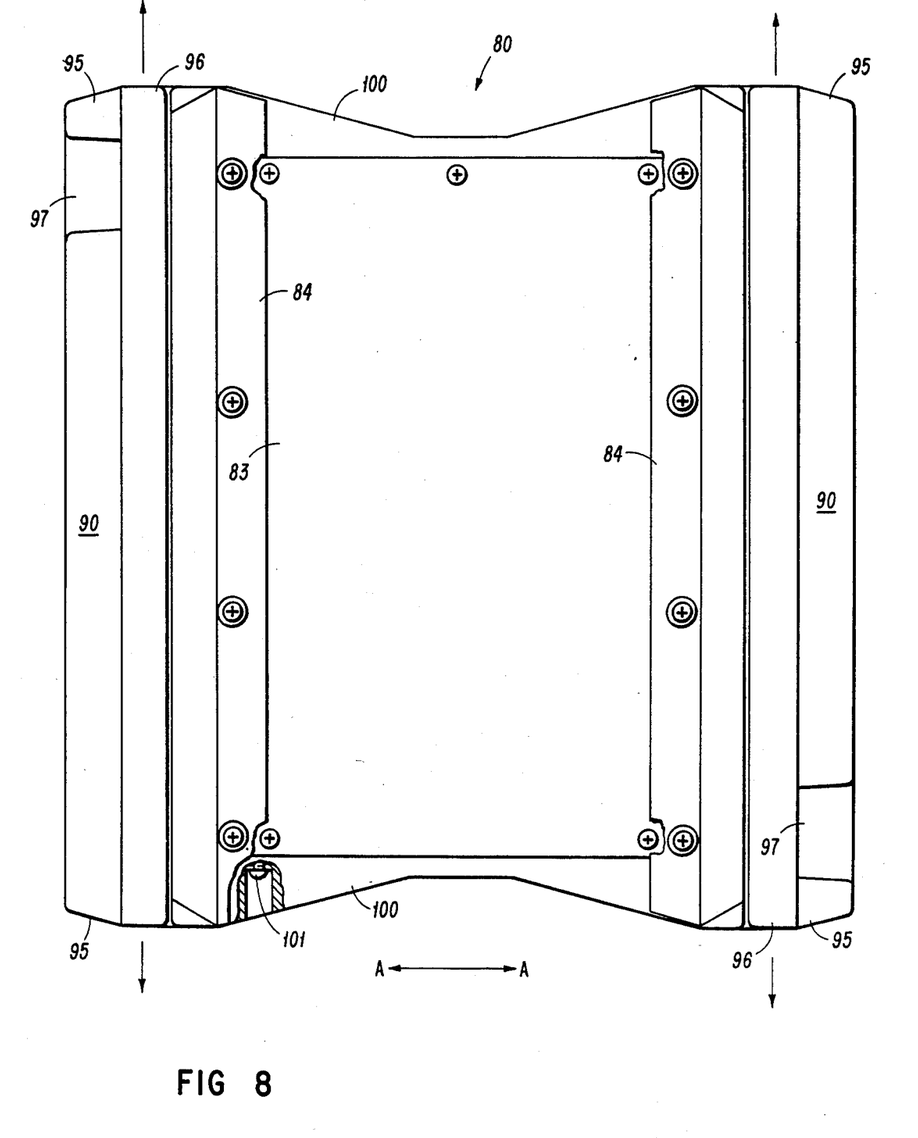
FIG. 8 is a side elevational view of the carrier.
Figure 9:
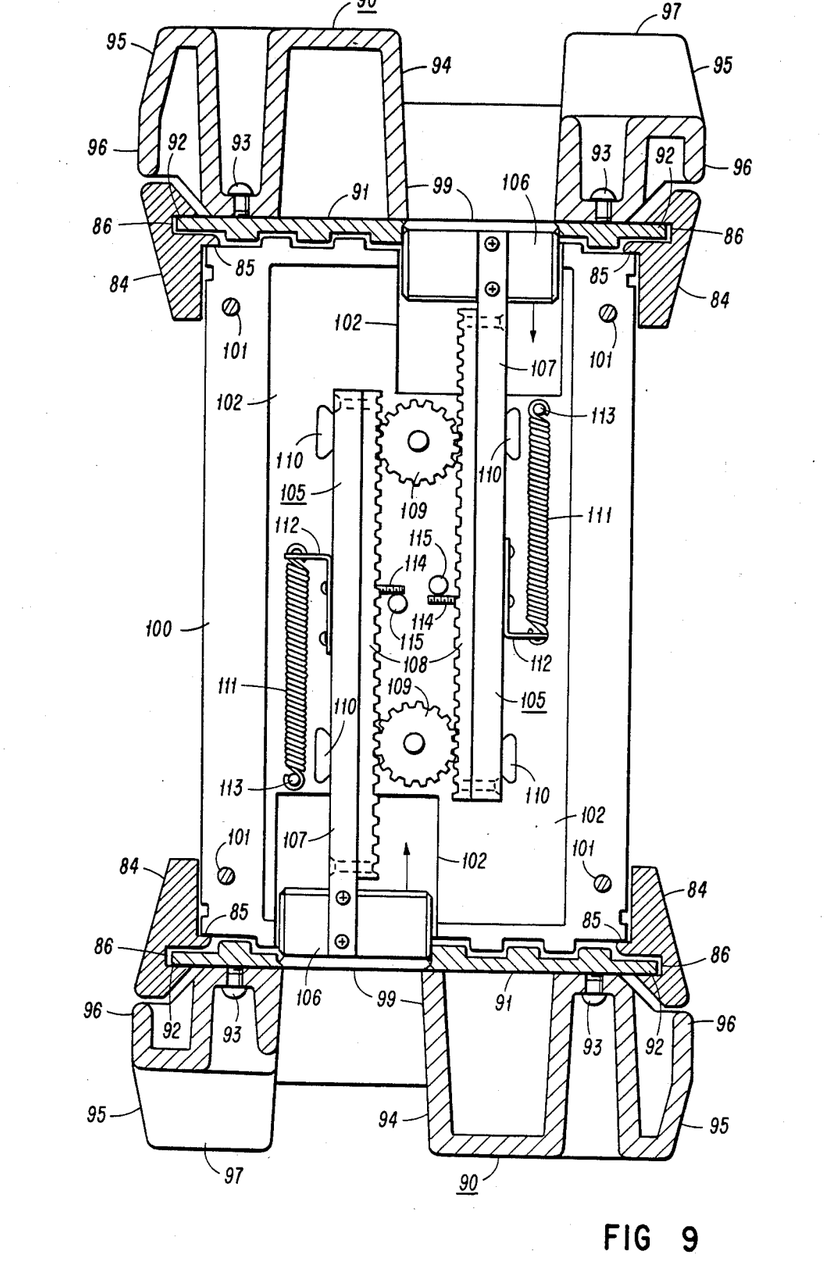
FIG. 9 is a sectional view taken along the lines 9—9 of FIG. 7 and illustrating one of the two locking mechanisms for the covers.

The side walls 81 of the carrier 80 receive waisted end caps 100 which fit between the extended ends of the carrier glides 84 and butt against the undersides of the ends of the cover end plates 91, being secured by screws 101 (see FIG. 8). Each end cap 100 is also molded from nylon and appropriately formed on its inner faces with recesses 102 to mount a cover locking mechanism. The latter includes a pair of spaced, parallel plungers 105 extending longitudinally of the end caps 100. The plungers 105 have rectangular locking heads 106 which slide in the recesses 102, as indicated in FIG. 9, and when in locking position, as shown in that FIG, are received in the openings 99 in the end plates 91, thus centering the covers 90 on the carriers 80 and preventing them from being slid in either direction. The locking heads 106 are screwed to the outer ends of a pair of plunger arms 107 to whose opposed faces are screwed a pair of rack bars 108, engaged by a pair of spaced pinions 109 journaled therebetween. The engagement of the rack bars 108 and pinions 109 is maintained by upstanding guides 110 on the end caps 100 against which the backs of the arms 107 slide. The plungers 105 are biased to their locking position by a pair of extensible coil springs 111 anchored at one end to brackets 112 screwed to the backs of the plunger arm 107 and at the other end to posts 113 in the end caps 100. Suitable stop pins 114 on the faces of the rack bars 108 engage stops 115 on the end caps 100 to prevent the plungers 105 from being driven beyond the shelf plates 91 by the springs 111. Hence when the locking heads 106 of one cover 90 are both engaged through the cover openings 99 and pushed inwardly, rotation of the pinions 109 will retract the plungers 105 from engagement with the other cover 90 and so release it for sliding movement to either side in order to open the carrier 80.

d. Operation

To send a carrier 80 from a terminal T to the terminal C, the teller's "Send" button is pushed, activating a motor to close the receiver 27, after which an air valve is opened to admit air from the intake 26 to beneath the carrier 80 on the shelf 28 and at the same time the blower CB is energized. The carrier is thus sucked up from the receiver 27 and through the tube 14, the air ahead of it being exhausted through the check valve 25 at the blower CB. Once past the latter the carrier 80 descends through the vertical tube section 22 into the receiver 35, landing on a rebound cushion 118 affixed to the top of the shelf plate 44 and apertured congruently therewith at 119. As the carrier 80 descends it is braked by the column of air in the customer receiver 35 which at that time is closed to the atmosphere. Closure of the receiver 35 is accomplished by suitable sealing material along the margins of the panels 40 and 50 and by first and second air valves. The first air valve, generally indicated at 120 (see FIGS. 3-5), includes a flexible, rectangular flap 121 beneath the shelf plate 44 and within its aperture 45. The flap 121 is secured at 122 to the upper face of a plate 123 fixed within the receiver 35 and having two rows of laterally spaced apertures 124 along its length. Beneath the plate 123 is disposed the second air valve, generally indicated at 125, consisting of a flanged plate 126 whose forward corners are pivoted at 127 to brackets (not shown) secured to the receiver side walls 38. One end of a link arm 128 is pivoted at 129 to one end flange of the plate 126 to the rear of the latter's pivot 127, the other end of the link arm 128 being pivoted at 130 in turn to a rotary solenoid S secured to the adjacent receiver side wall 38 and controlled by a switch SW3. Hence when solenoid S is energized the air valve 125 moves from its closed position shown in FIG. 4 to its open position by swinging downwardly about its pivot 127, as indicated by the arrow in that FIG. The air valve 125 is maintained in its closed position during transit of the carrier 80 from the terminal T to the terminal C in order that no air is drawn by the blower CB into the tube 14 through the receiver 35.

The direction of travel of the carrier 80 in the system is indicated by the arrow A—A if FIG. 8, whereby its leading and trailing ends comprise the two carrier covers 90. Hence when the carrier 80 arrives at either terminal T or C one of the covers 90 is always upper and the other lower, the relationship altering between the two terminals since the carrier is a captive one. As the carrier 80 arrives on the cushion 118 a pair of probes 131 upstanding from the lateral edges of the shelf plate 44, and diagonally offset from each other equal to the diagonal offset of the locking heads 106 of the covers 90, engage the exposed heads 106 of the locking plungers 105 of the lower cover 90, thus locking the upper cover 90 in the manner previously described. At the same time arrival of the carrier 80 deenergized the blower CB and activates the receiver motor RM, whereby the linkage 60 opens the panels 40 and 50 in the manner previously described tilting the carrier outwardly as shown in FIG. 5. The upper carrier cover 90 thus arrives beneath the door panel 31 on the front of the housing 30. As the cover 90 moves under the door panel 31 one of the recesses 97 in the cover 90 swings into engagement with a tang 132 depending from the inner face of the door panel 31. The door panel motor is then automatically energized to move the panel 31 laterally as indicated in FIG. 5, whereupon the tang 132 slides the cover 90 to one side opening the carrier 80 to the customer.

When the customer completes his transaction, he or she pushed the "Send" button which energizes the door panel motor in the appropriate direction, thus closing the door panel 31 whereby the tang 132 at the same time moves the cover 90 to its closed position. The door panel motor is then automatically deenergized and the reciever motor RM automatically activated in the opposite direction to close the panels 40 and 50 and return the carrier 80 to within the receiver 35. When that occurs the blower TB and the air valve solenoid S are automatically energized, thereby opening the air valve 125 in order to send the carrier 80 to the terminal T, air being drawn into the receiver 35 beneath the carrier 80 through the air valve 120 as the free halves of its flap 121 flex upwardly, as indicated by the arrows in FIG. 4. As the carrier 80 rises from the cushion 118 free of the probes 130, the plungers 105 spring outwardly and so relock both carrier covers 90. When the carrier 80 arrives in the teller receiver 27 on the cushioned shelf 28, the blower TB is automatically deenergized and the air valve 125 closed via its solenoid S. A pair of similar probes 133 unlock the upper cover 90 as the carrier 80 arrives and the receiver 27 automatically opens, sliding the carrier 80 out from beneath the cover 90, which is retained within the terminal T, for access by the teller. The electrical "logic" by which all the foregoing is accomplished is conventional and quite within the ordinary skill of the art to provide. Since it is no part of the present invention, it is not further described.

The present invention, of course, is usable for other purposes than banking, for instance, in laboratories, hospitals, businesses and so forth where heavier objects can advantageously be pneumatically transmissted between remote stations. So though the invention has been described in terms of a particular use and embodiment, that embodiment being the best mode known of carrying out the invention, it is not limited to that use and embodiment alone. Instead, the following claims are to be read as encompassing all adaptations and modifications of the invention falling within its scope and spirit.

I claim:

1. A carrier for use in a rectangular pneumatic tube system, the carrier being a generally rectangular, normally closed container for transport of articles through the system, the carrier comprising: a pair of parallel opposite end walls constituting covers for the carrier, each cover being slidable in either of two opposite directions from a closed to an open position for access to the interior of the carrier; locking means for locking each of the covers in its closed position; and unlocking means for each cover, the unlocking means for each cover being operatively exposed through a pair of apertures through the other cover.

2. The carrier of claim 1 wherein the cover apertures of each cover are diagonally offset relative to each other.

3. The carrier of claim 2 wherein the cover apertures of one cover are also diagonally offset relative to the cover apertures of the other cover.

4. The carrier of claim 3 wherein the unlocking means conjointly unlocks both covers at the same time.

5. The carrier of claim 4 wherein the carrier includes side walls extending between the carrier covers; and wherein the locking means are disposed on at least one of the carrier side walls, each locking means including a pair of bolt members engaged in and exposed through the apertures in respective ones of the carrier covers effective to lock the covers in their closed position, means operatively interconnecting the bolt members effective so that a force applied to one of the bolt members through its respective cover aperture in a direction normal to its respective carrier cover resutlts in withdrawal of both bolt members from their respective cover apertures effective to unlock both carrier covers for slidable movement to their open position, and means biasing the bolt members into their locking positions.

6. The carrier of claim 1 wherein the unlocking means conjointly unlocks both covers at the same time.

7. The carrier of claim 6 wherein the carrier includes a pair of opposite side walls extending between the carrier covers, and wherein the locking means comprise a pair of duplicate locking means respectively disposed on said carrier side walls, each locking means including a pair of parallel spaced racks extending normally of the carrier covers and longitudinally slidable of their respective carrier side walls, latch means operable by opposite longintudinal movement of each rack for engaging and disengaging apertures in and through respective ones of the covers, a pinion gear engaging both racks effective so that longitudinal movement of one rack in opposite directions causes engagement and disengagement of its respective latch means of the other rack in opposite directions to respectively engage and disengage its respective latch means and cover aperture, and means biasing the racks in opposite directions to provide engagement of the latch means with the cover apertures.

8. The carrier of claim 7 wherein the latch means comprises a locking bolt attached to one end of each rack; and wherein the locking bolts and cover apertures of each cover are diagonally offset relative to each other.

9. The carrier of claim 8 wherein the locking bolts and cover apertures of one cover are also diagonally offset relative to the locking bolts and cover apertures of the other cover.

10. The carrier of claim 9 wherein rectangular margins of each cover include guide means for guiding the carrier through the tube.

* * * * *